(12) United States Patent
Register

(10) Patent No.: US 11,001,014 B2
(45) Date of Patent: May 11, 2021

(54) MANDREL FOR SUPPORTING STRUCTURAL MEMBER DURING PROCESSING

(71) Applicant: The Boeing Company, Chicago, IL (US)

(72) Inventor: Justin H. Register, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 369 days.

(21) Appl. No.: 15/835,881

(22) Filed: Dec. 8, 2017

(65) Prior Publication Data

US 2019/0176410 A1 Jun. 13, 2019

(51) Int. Cl.
| | |
|---|---|
| *B29C 33/38* | (2006.01) |
| *B29C 33/50* | (2006.01) |
| *B29C 33/76* | (2006.01) |
| *B64C 1/12* | (2006.01) |
| *B64F 5/10* | (2017.01) |
| *B29C 70/34* | (2006.01) |
| *B64C 1/00* | (2006.01) |
| *B29L 31/30* | (2006.01) |

(52) U.S. Cl.
CPC ........ *B29C 70/342* (2013.01); *B29C 33/3821* (2013.01); *B29C 33/505* (2013.01); *B29C 33/76* (2013.01); *B64C 1/12* (2013.01); *B64F 5/10* (2017.01); *B29L 2031/3082* (2013.01); *B64C 2001/0072* (2013.01)

(58) Field of Classification Search
CPC .......................... B29C 33/505; B29C 33/3821
See application file for complete search history.

(56) References Cited

U.S. PATENT DOCUMENTS

| | | | | |
|---|---|---|---|---|
| 8,986,479 B2* | 3/2015 | Evens | ..................... | B29C 73/32 |
| | | | | 156/94 |
| 10,336,019 B2* | 7/2019 | Nelson | ..................... | B32B 37/10 |
| 10,639,855 B2* | 5/2020 | Hockemeyer | ........... | B29C 70/46 |
| 2012/0080135 A1* | 4/2012 | Evens | ..................... | B32B 37/10 |
| | | | | 156/94 |
| 2015/0107233 A1* | 4/2015 | Ou | ......................... | F15B 15/10 |
| | | | | 60/327 |
| 2015/0158258 A1* | 6/2015 | Nelson | ..................... | B29C 73/32 |
| | | | | 156/382 |
| 2017/0232688 A1* | 8/2017 | Sellinger | ............... | B29C 70/446 |
| | | | | 264/258 |
| 2018/0222130 A1* | 8/2018 | Hockemeyer | ........... | B29C 70/46 |
| 2019/0106030 A1* | 4/2019 | Kim | ....................... | B60N 2/914 |
| 2020/0223160 A1* | 7/2020 | Hockemeyer | ........... | B29C 70/44 |

* cited by examiner

*Primary Examiner* — Marc C Howell
*Assistant Examiner* — Nicholas J Chidiac
(74) *Attorney, Agent, or Firm* — McDonnell Boehnen Hulbert & Berghoff LLP

(57) ABSTRACT

Within examples, a mandrel is configured to be inserted into a cavity defined by an interior wall of a structural member to support the structural member during processing. The mandrel includes a first bladder containing a material, the material being capable of exhibiting granular jamming when air is removed from the first bladder. The mandrel further includes a second bladder configured to expand and apply a force to the first bladder. Systems and methods that relate to the mandrel are also described within examples.

20 Claims, 9 Drawing Sheets

MANDREL FOR SUPPORTING STRUCTURAL MEMBER DURING PROCESSING

FIELD

The present disclosure generally relates to mandrels, and more specifically to mandrels configured to be inserted into a cavity defined by an interior wall of a structural member to support the structural member during processing.

BACKGROUND

Composite parts, such as those used in the manufacture of aircraft, can be constructed using various production methods, such as filament winding, tape placement, hand lay-up, or other composite processing techniques and curing processes. Most of these processes use a rigid cure tool/mandrel on which composite material is applied and then cured into a rigid composite part. For example, automated fiber placement (AFP) machines may be used to place fiber reinforcements on molds or mandrels to form composite layups. Following, composite parts may be cured within an autoclave that applies heat and pressure to the part during a cure cycle.

Some composite part geometries include internal cavities that may require a tool such as a supporting bladder that is placed in the cavity to ensure that the part geometry is properly maintained during application of composite material or when processed under autoclave pressure. The supporting bladder may be an inflatable bladder that fits into an internal cavity and is inflated during an autoclave cure process so as to react to the autoclave pressure force applied to the part. Typically, such inflatable bladders are pressurized by venting them to the autoclave pressure through a vacuum bag. The deflated bladder can then be removed after autoclave processing.

However, the bladders that are used to support a composite part (e.g., a stringer or other longitudinal structural piece in a framework) for autoclave curing might not be suitable when alternatively curing the part out-of-autoclave (e.g., as performed with repairs). In such cases, the part and the bladder are exposed to different temperature and pressure conditions than in an autoclave such that an inflatable bladder may not meet some processing requirements. This creates a need for a support tool that can fit into a composite part cavity prior to cure, can conform to the internal geometry of the part cavity during out-of-autoclave curing or other processing conditions, and can reduce in size to be removed from the part after cure.

SUMMARY

A first example of the disclosure is a mandrel configured to be inserted into a cavity defined by an interior wall of a structural member to support the structural member during processing. The mandrel includes a first bladder containing a material, the material being capable of exhibiting granular jamming when air is removed from the first bladder. The mandrel also includes a second bladder configured to expand and apply a force to the first bladder.

A second example of the disclosure is a system for supporting a structural member during processing. The system includes a mandrel configured to be inserted into a cavity defined by an interior wall of the structural member. The mandrel includes a first bladder that includes a vacuum port, the first bladder containing a material being capable of exhibiting granular jamming when air is removed from the first bladder. The mandrel also includes a second bladder that includes a vacuum port, the second bladder being configured to expand and apply a force to the first bladder. The system also includes one or more pumps that, when the mandrel is within the cavity, are configured to perform functions. The functions include removing air from the first bladder via the vacuum port of the first bladder to compress the material such that the material exhibits granular jamming that causes the first bladder to provide rigid support against the interior wall. The functions also include moving air into the second bladder via the vacuum port of the second bladder, thereby causing the second bladder to expand and press the first bladder against the interior wall.

A third example of the disclosure is a method for operating a mandrel to support a structural member during processing. The method includes inserting the mandrel into a cavity defined by an interior wall of the structural member, the mandrel including a first bladder and a second bladder. The method further includes removing air from the first bladder to compress a material contained by the first bladder such that the material exhibits granular jamming that causes the first bladder to provide rigid support against the interior wall. The method further includes moving air into the second bladder, thereby expanding the second bladder to press the first bladder against the interior wall. The method further includes processing the structural member while the material contained by the first bladder exhibits granular jamming that causes the first bladder to provide rigid support against the interior wall and while the second bladder presses the first bladder against the interior wall. The method further includes removing air from the second bladder and removing the mandrel from the cavity.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Figure 1:
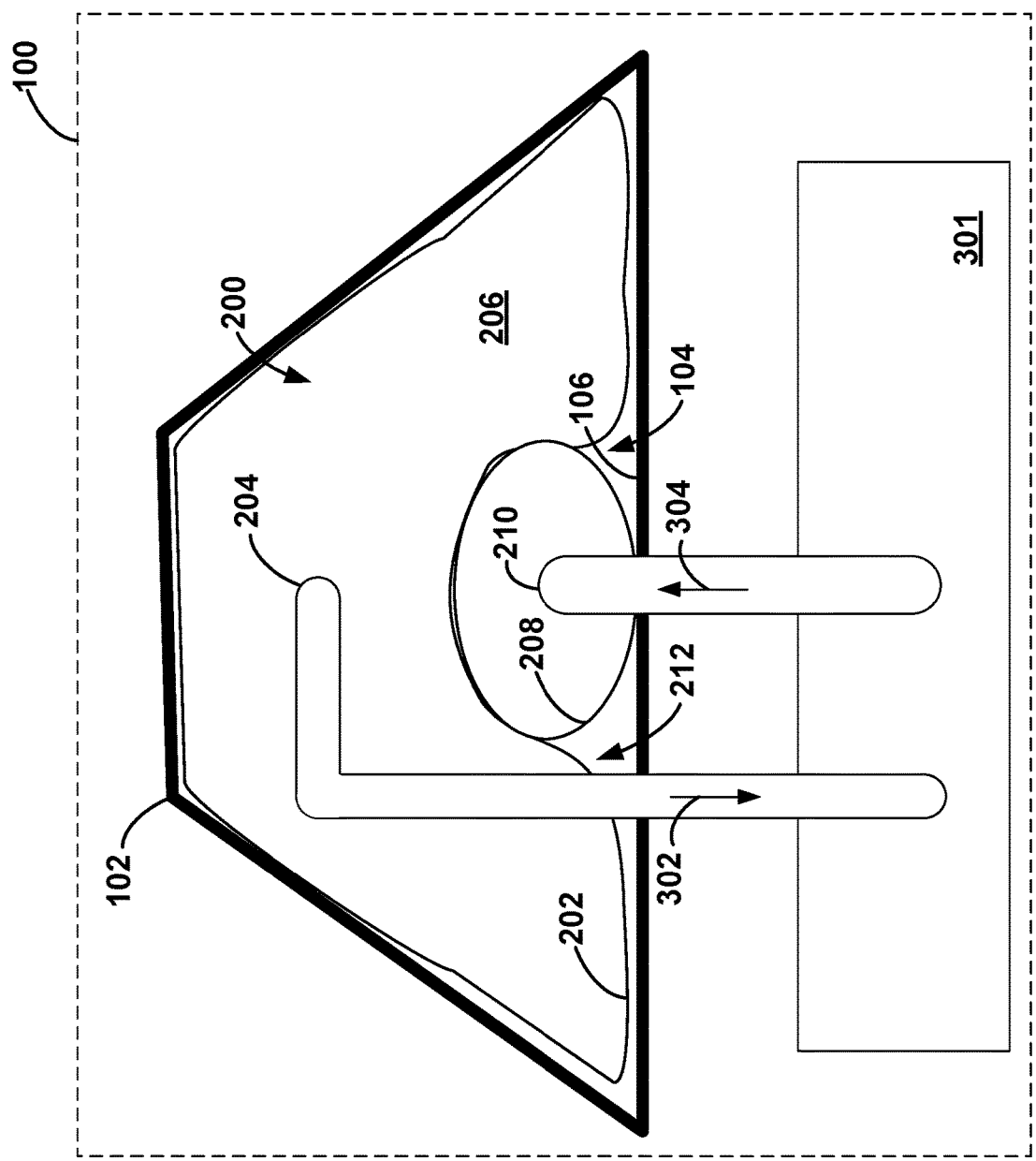
FIG. 1 is a schematic diagram of a system for supporting a structural member during processing, according to an example embodiment.

As discussed above, there exists a need for a support tool that can fit into a composite part cavity for out-of-autoclave processing or other (e.g., unconventional) composite processing, can conform to the internal geometry of the part cavity during processing, and can reduce in size to be removed from the part cavity after processing. Accordingly, such systems and related methods are disclosed herein.

Within examples, a mandrel is configured to be inserted into a cavity defined by an interior wall of a structural member to support the structural member during processing. For instance, an aircraft may include a hollow stringer that forms part of an internal support structure for an external surface (e.g., skin) of the aircraft. The mandrel may be inserted into a cavity defined by an interior wall of the stringer to support the stringer during out-of-autoclave repair. The mandrel includes a first bladder containing a material, the material being capable of exhibiting granular jamming when air is removed from the first bladder (e.g., with a pump). The mandrel also includes a second bladder configured to expand and apply a force to the first bladder and/or increase a volume within the cavity that is occupied by the mandrel (e.g., by inflating the second bladder with a pump). The second bladder can be positioned externally adjacent to the first bladder, positioned within a cavity formed by the external surface of the first bladder, or even positioned within the first bladder. Some mandrel embodiments may include additional first bladders having any or all of the characteristics of the aforementioned first bladder and/or additional second bladders having any or all of the characteristics of the aforementioned second bladder.

The first bladder and the second bladder may respectively take the form of a balloon, a sack, or any flexible container formed of one or more of rubber, latex, polychloroprene, nylon fabric, or other elastic materials that are substantially impermeable to gases such as air, nitrogen, oxygen, argon, carbon dioxide, etc. The second bladder typically does not contain any solid material. The material contained by the first bladder may include one or more of a granular material, sand, ball bearings, glass beads, quartz beads, a foam, a polymer, an emulsion, or a suspension. The relatively small particle size of the material within the first bladder allows the material to conform to the surface of the interior wall when the material (e.g., the first bladder) is pushed against the interior wall of the structural member. As an example, the material may have at least one dimension that is greater than 0.1 µm, greater than 1.0 µm, or greater than 100 µm. For example, a technician may manipulate the shape of the first bladder so that the mandrel can be inserted into the cavity of the structural member. Within the cavity, the first bladder may conform somewhat to the shape of the interior wall.

Once the mandrel is within the cavity, air, nitrogen, or other gases may be removed from the first bladder and air may be moved into the second bladder. In one example, air may be moved into the second bladder before air is removed from the first bladder, although, in other examples the air may be removed from the first bladder before the air is moved into the second bladder. Additionally or alternatively, air may be removed from the first bladder and moved into the second bladder simultaneously or in an alternating sequence.

Removing air from the first bladder generally compresses the material contained within the first bladder to cause the material to exhibit granular jamming. That is, the material is compressed to cause the material to increase in density and as a whole to behave as a single dense and rigid portion of solid material. Thus, when the mandrel is within the cavity of the structural member and the material within the first bladder is caused to exhibit granular jamming, the material collectively "hardens" into a shape that conforms somewhat to the interior wall of the cavity. Moving air into the second bladder may compensate for any decrease in volume of the first bladder caused by the removal of air from the first bladder and also may cause the second bladder to expand and force the first bladder to better conform to the shape of the interior wall. As such, the mandrel can be placed into the cavity and shaped and hardened to provide rigid support during processing that conforms well to the shape of the cavity. After processing, the second bladder may be deflated to decrease the overall size of the mandrel so that the mandrel can be removed from the cavity.

Disclosed embodiments will now be described more fully hereinafter with reference to the accompanying Drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

FIG. 1 shows an example system 100 for supporting a structural member during processing. The system 100 includes a mandrel 200 configured to be inserted into a cavity 104 defined by an interior wall 106 of the structural member 102. The mandrel 200 includes a first bladder 202 that includes a vacuum port 204. The first bladder 202 contains a material 206 being capable of exhibiting granular jamming when air 302 is removed from the first bladder 202. The mandrel 200 further includes a second bladder 208 that includes a vacuum port 210, the second bladder 208 being configured to expand and apply a force to the first bladder 202. For example, the second bladder 208 may be in contact with the first bladder 202. The system 100 further includes one or more pumps 301 that, when the mandrel 200 is within the cavity 104, are configured to perform functions. The functions include removing air 302 from the first bladder 202 via the vacuum port 204 of the first bladder 202 to compress the material 206 such that the material 206 exhibits granular jamming that causes the first bladder 202 to provide rigid support against the interior wall 106. The functions further include moving air 304 into the second bladder 208 via the vacuum port 210 of the second bladder 208, thereby causing the second bladder 208 to expand and press the first bladder 202 against the interior wall 106.

Figure 9:
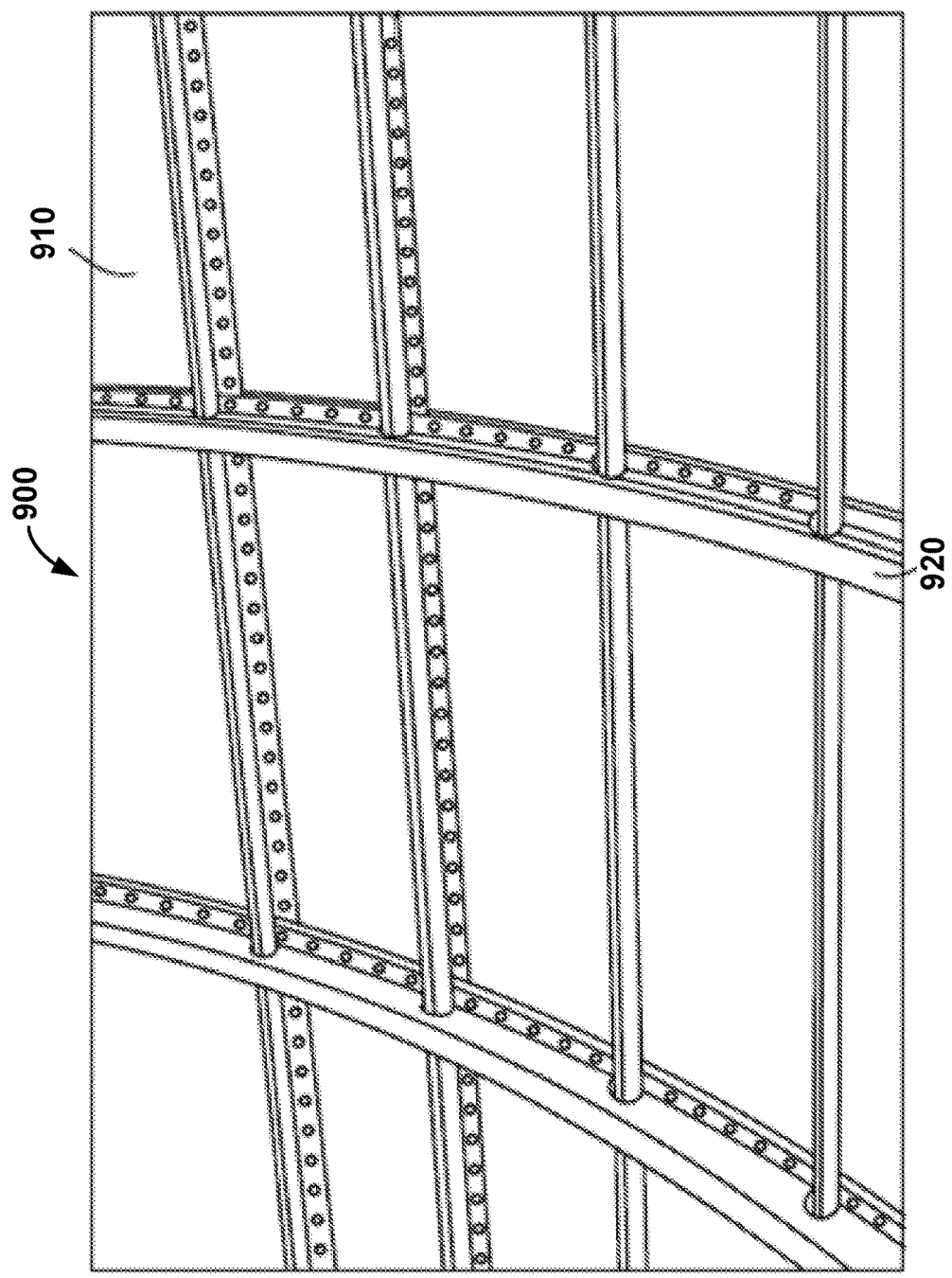
FIG. 9 depicts a fuselage barrel of an aircraft, according to an example embodiment.

The structural member 102 may take the form of a stiffening element or stringer on the skin of an aircraft, among other examples. The structural member 102 shown in FIG. 1 has a trapezoidal cavity 104 defined by the interior wall 106, but other structural members may have cavities with other shapes. FIG. 9 shows an example fuselage barrel 900 of an aircraft. The fuselage barrel 900 includes a (e.g., composite) fuselage skin 910 and one or more structural members 920 (e.g., stringers) that provide structural support for the fuselage skin 910. The structural member 102 may similarly provide support for a skin of a wing or a fuselage of an aircraft among other examples.

The first bladder 202 and the second bladder 208 may respectively take the form of a balloon, a sack, or any flexible container formed of one or more of rubber, latex, polychloroprene, nylon fabric, or other elastic materials. The second bladder 208 typically does not contain any solid material. The material 206 contained by the first bladder 202 may include one or more of a granular material, sand, ball bearings, glass beads, glass microspheres, quartz beads, a foam (e.g., a metal foam), a polymer, an emulsion, or a suspension. As shown in FIG. 1, the second bladder 208 is positioned adjacent to an exterior surface 212 of the first bladder 202.

The one or more pumps 301 may include one or more mechanical pumps or any other type of pump.

Figure 2:
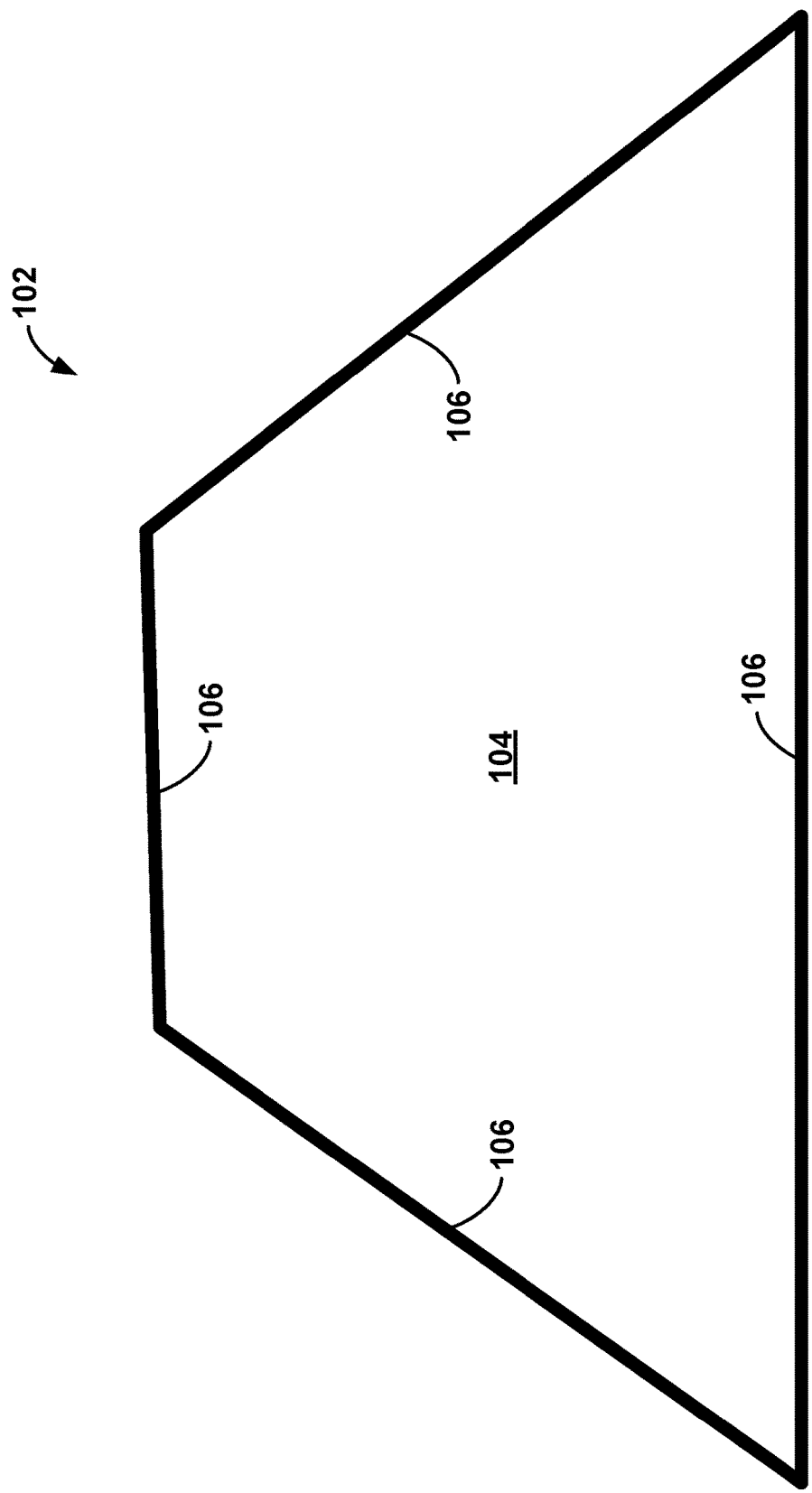
FIG. 2 is a schematic diagram of a structural member, according to an example embodiment.

FIG. 2 is a schematic diagram of the structural member 102. As shown, the cavity 104 has a trapezoidal shape defined by four sections of the interior wall 106.

Figure 3:
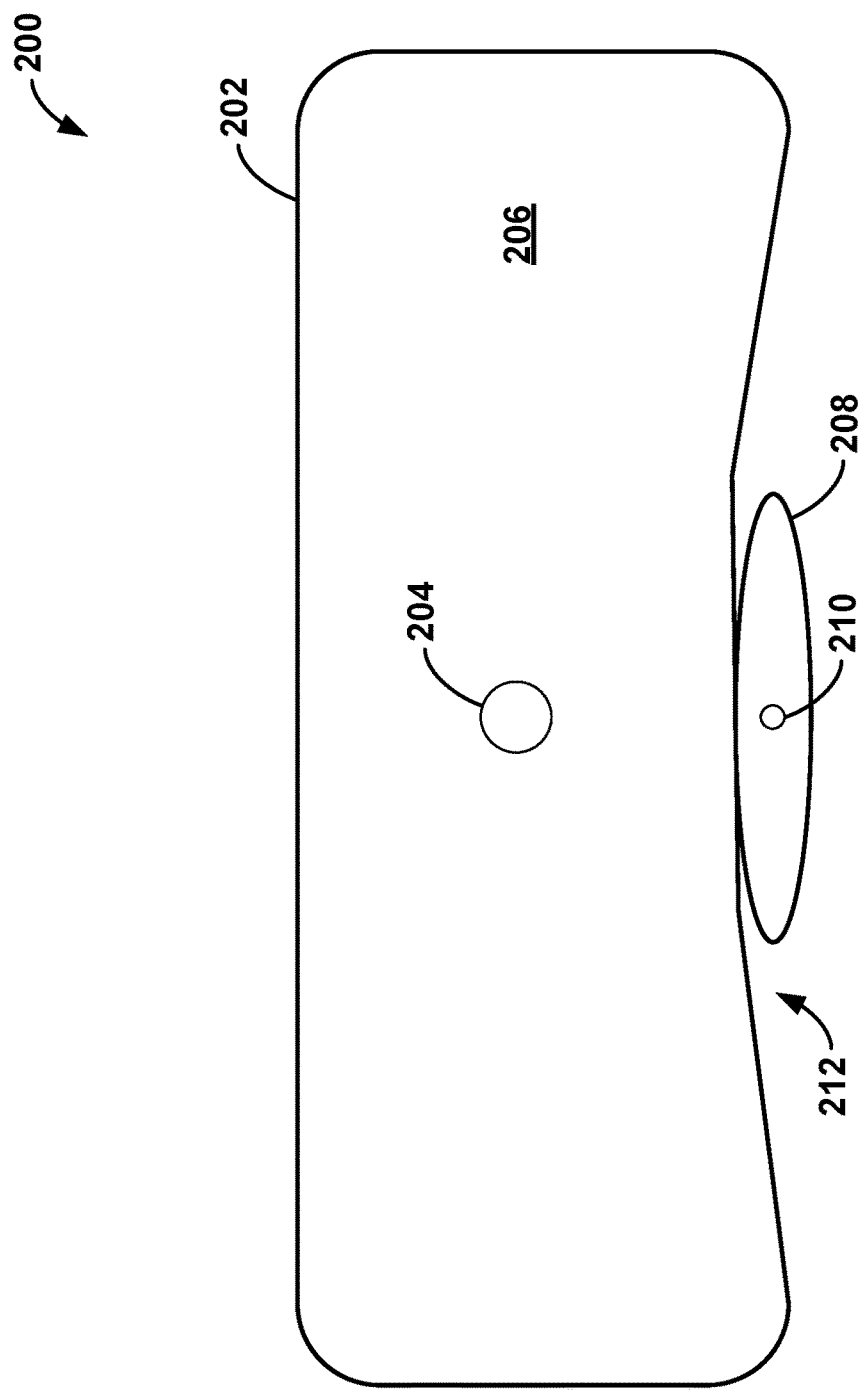
FIG. 3 is a schematic diagram of a mandrel, according to an example embodiment.

FIG. 3 is a schematic diagram of the mandrel 200. In FIG. 3, the mandrel 200 is shown outside of the cavity 104.

Figure 4:
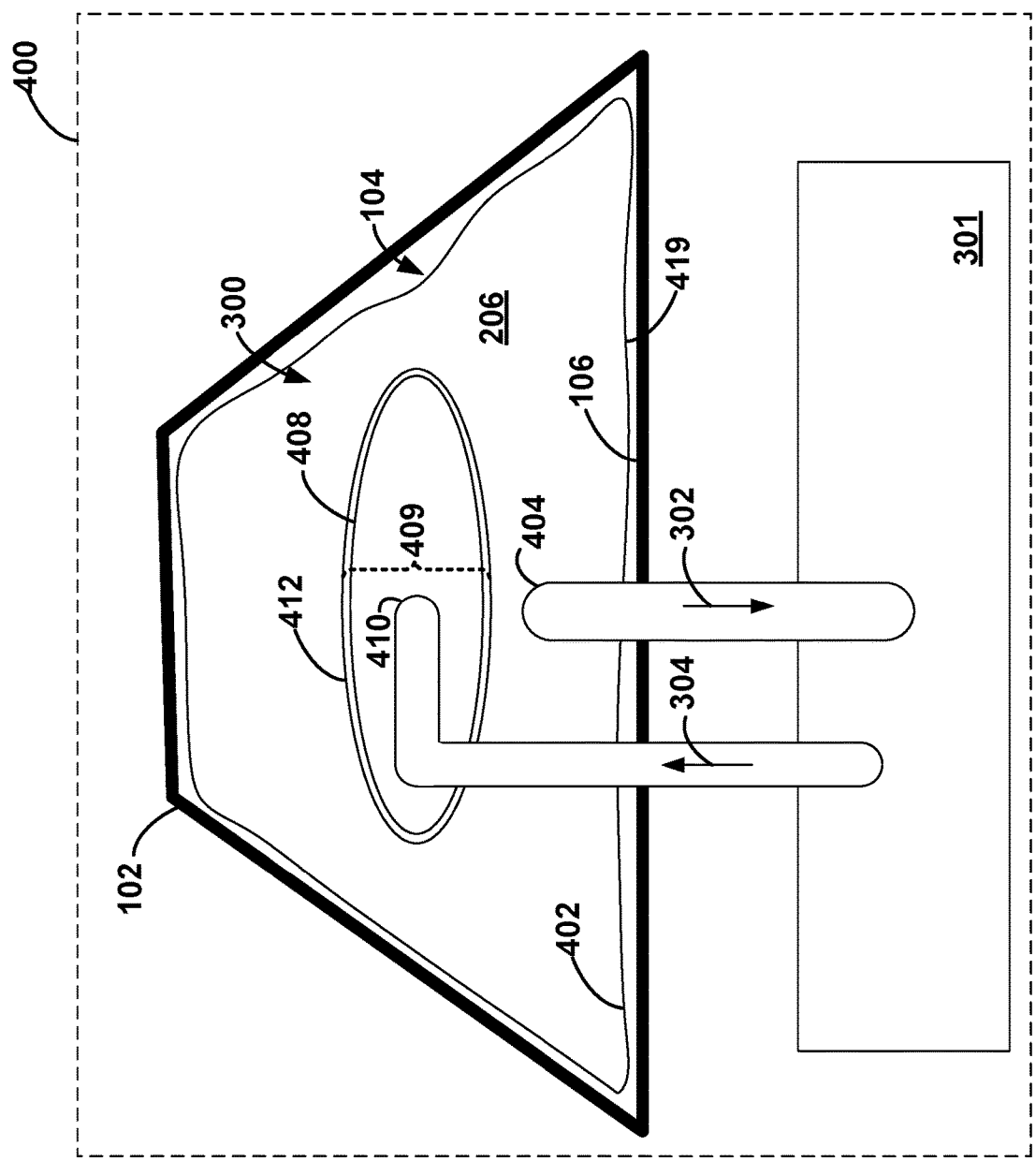
FIG. 4 is a schematic diagram of a system for supporting a structural member during processing, according to an example embodiment.

FIG. 4 is a schematic diagram of a system 400 for supporting the structural member 102 during processing. The system 400 is substantially similar to the system 100, except that the mandrel 300 replaces the mandrel 200 within the system 400.

The system 400 includes the mandrel 300 that is configured to be inserted into the cavity 104 defined by the interior wall 106 of the structural member 102. The mandrel 300 includes a first bladder 402 that includes a vacuum port 404. The first bladder 402 contains the material 206 being capable of exhibiting granular jamming when air 302 is removed from the first bladder 402. The mandrel 300 further includes a second bladder 408 that includes a vacuum port 410, the second bladder 408 being configured to expand and apply a force to the first bladder 402 (e.g., to the exterior surface 412). The system 400 further includes one or more pumps 301 that, when the mandrel 300 is within the cavity 104, are configured to perform functions. The functions include removing air 302 from the first bladder 402 via the vacuum port 404 of the first bladder 402 to compress the material 206 such that the material 206 exhibits granular jamming that causes the first bladder 402 to provide rigid support against the interior wall 106. The functions further include moving air 304 into the second bladder 408 via the vacuum port 410 of the second bladder 408, thereby causing the second bladder 408 to expand and press the first bladder 402 against the interior wall 106.

The first bladder 402 and the second bladder 408 may respectively take the form of a balloon, a sack, or any flexible container formed of one or more of rubber, latex, polychloroprene, nylon fabric, or other elastic materials. The second bladder 408 typically does not contain any solid material. The material 206 contained by the first bladder 402 may include one or more of a granular material, sand, ball bearings, glass beads, quartz beads, a foam, a polymer, an emulsion, or a suspension. As shown in FIG. 4, an exterior surface 412 of the first bladder 402 defines a cavity 409 that is substantially surrounded by the first bladder 402. As shown in FIG. 4, the exterior surface 412 may define a boundary between a volume that is contained within the first bladder 402 and a volume that is not contained within the first bladder 402. However, the exterior surface 412 may at least be partially or substantially surrounded by another exterior surface 419 of the first bladder 402. The second bladder 408 is positioned within the cavity 409 defined by the exterior surface 412 of the first bladder 402.

Figure 5:
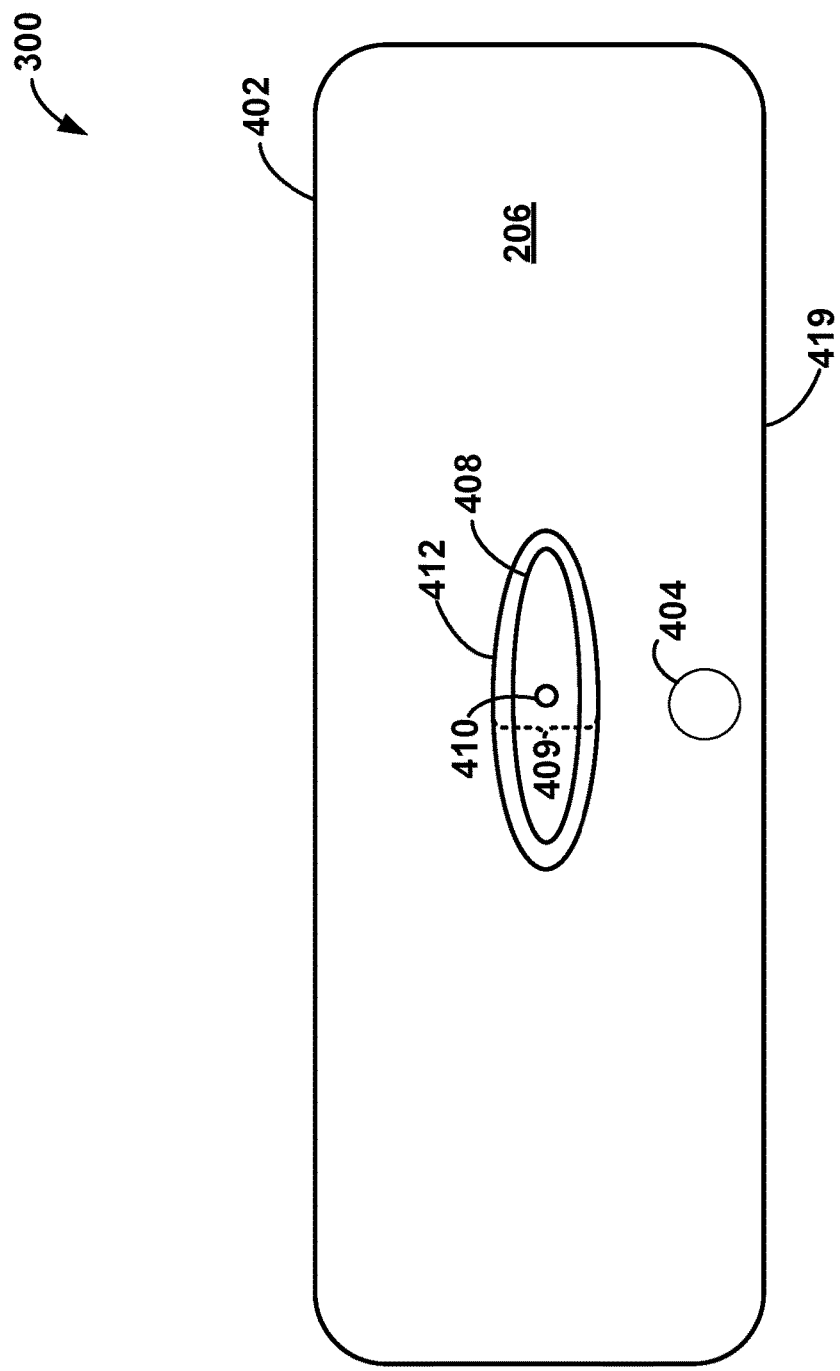
FIG. 5 is a schematic diagram of a mandrel, according to an example embodiment.

FIG. 5 is a schematic diagram of the mandrel 300. In FIG. 5, the mandrel 300 is shown outside of the cavity 104.

Figure 6:
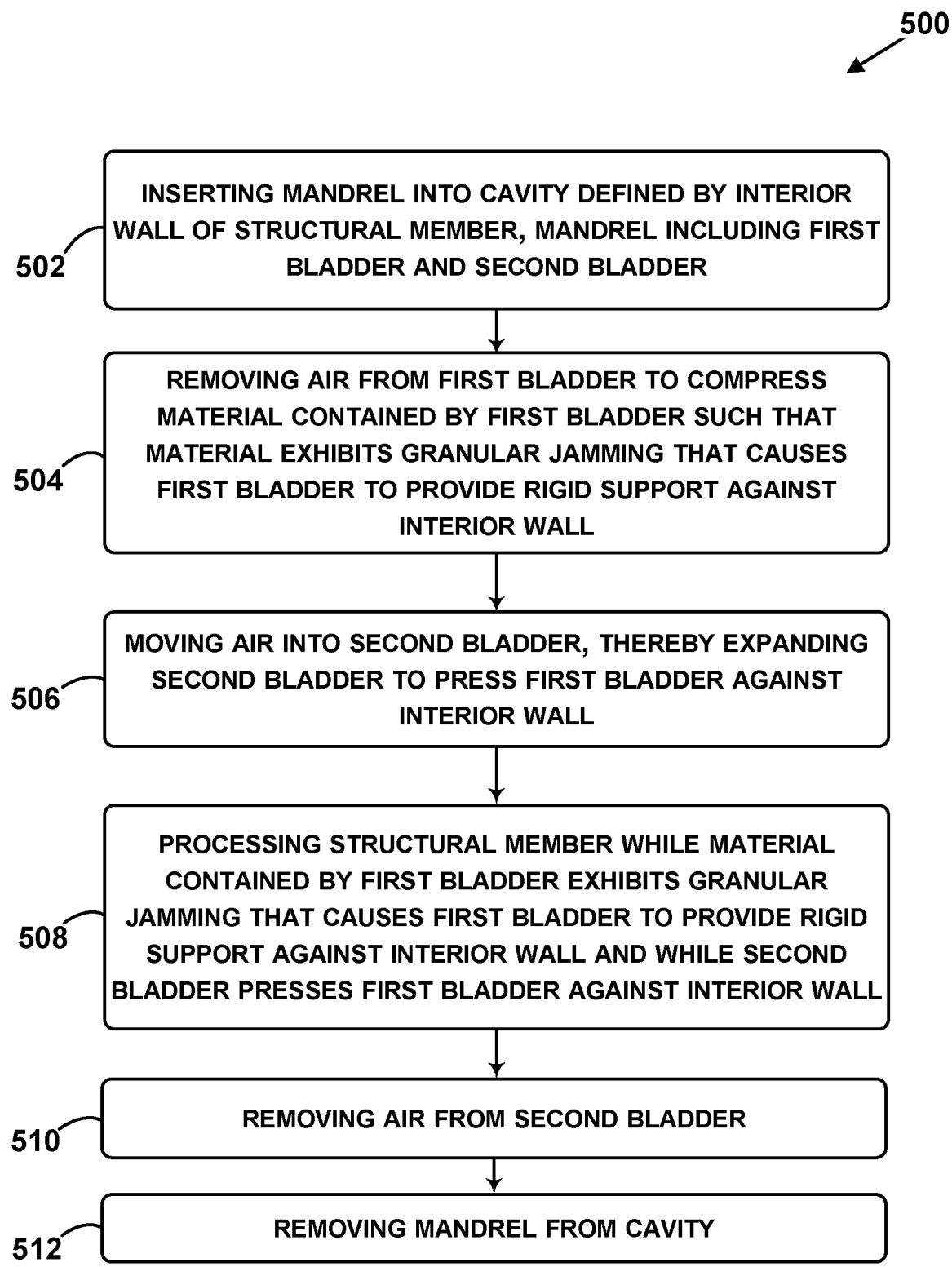
FIG. 6 is a block diagram of a method, according to an example embodiment.

FIG. 6 is a block diagram of an example method 500 for operating a mandrel to support a structural member. For example, the method 500 may involve operating the mandrel 200 or the mandrel 300 to support the structural member 102.

Figure 7:
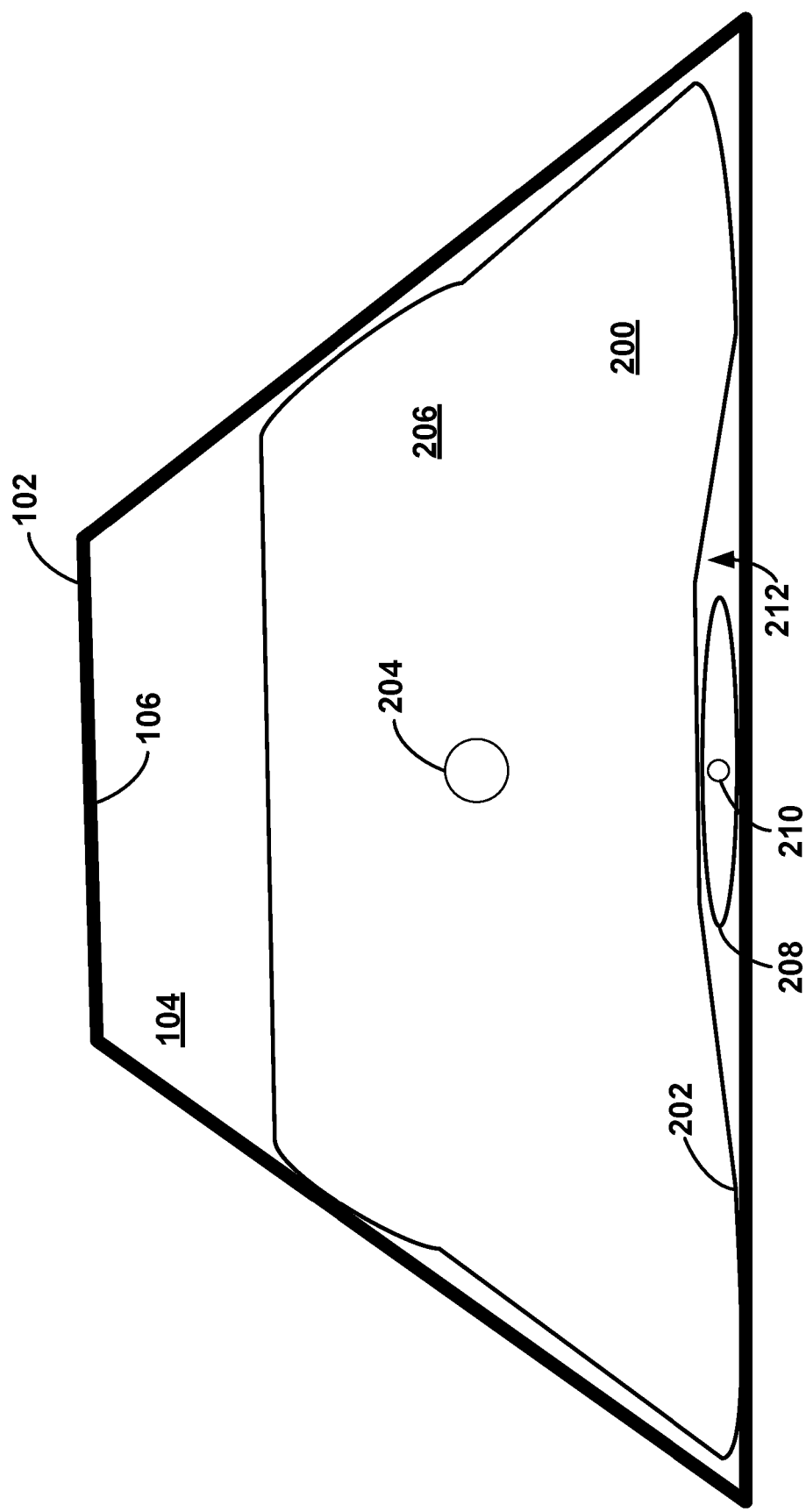
FIG. 7 is a schematic diagram of a mandrel within a cavity of a structural member, according to an example embodiment.

At block 502, the method 500 includes inserting the mandrel into a cavity defined by an interior wall of the structural member. In this context, the mandrel includes a first bladder and a second bladder. As shown in FIG. 7, the mandrel 200 may be inserted into the cavity 104 defined by the interior wall 106 of the structural member 102. FIG. 7 depicts the mandrel 200 before air has been removed from the first bladder 202 and before air has been moved into the second bladder 208. As such, the mandrel 200 does not yet substantially fill the cavity 104. As alternatively shown in FIG. 4, the mandrel 300 may be inserted into the cavity 104 of the structural member 102.

At block 504, the method 500 includes removing air from the first bladder to compress a material contained by the first bladder such that the material exhibits granular jamming that causes the first bladder to provide rigid support against the interior wall. As shown in FIG. 1, the air 302 may be removed from the first bladder 202 such that the material 206 exhibits granular jamming that causes the first bladder 202 to provide rigid support against the interior wall 106. As shown in FIG. 4, the air 302 may be removed from the first bladder 402 such that the material 206 exhibits granular jamming that causes the first bladder 402 to provide rigid support against the interior wall 106. The one or more pumps 301 may be used to remove the air 302 from the first bladder 202 (or from the first bladder 402).

At block 506, the method 500 includes moving air into the second bladder, thereby expanding the second bladder to press the first bladder against the interior wall. As shown in FIG. 1, the air 304 may be moved into the second bladder 208, thereby expanding the second bladder 208 to press the first bladder 202 against the interior wall 106. As shown in FIG. 4, the air 304 may be moved into the second bladder 408, thereby expanding the second bladder 408 to press the first bladder 402 against the interior wall 106. The one or more pumps 301 may be used to move the air 304 into the second bladder 208 (or into the second bladder 408).

Blocks 504 and 506 may be performed simultaneously, iteratively, and/or sequentially. For example, the air 304 may be moved into the second bladder 208 (or the second bladder 408) after removing the air 302 air from the first bladder 202 (or the first bladder 402). Alternatively, the air 304 may be moved into the second bladder 208 (or the second bladder 408) before removing the air 302 from the first bladder 202 (or the first bladder 402). In some examples, the air 302 may be removed from the first bladder 202 (or the first bladder 402) at the same time that the air 304 is being moved into the second bladder 208 (or the second bladder 408). Additionally or alternatively, the removal of the air 302 and the movement of the air 304 may be performed iteratively by removing a portion of the air 302, followed by moving a portion of the air 304, followed by removing another portion of the air 302, followed by moving another portion of the air 304 etc. This iterative process may enable the first bladder 202 (or the first bladder 402) to provide rigid support against the interior wall 106 with a shape that substantially conforms to the interior wall 106.

At block 508, the method 500 includes processing the structural member while the material contained by the first bladder exhibits granular jamming that causes the first bladder to provide rigid support against the interior wall and while the second bladder presses the first bladder against the interior wall.

Figure 8:
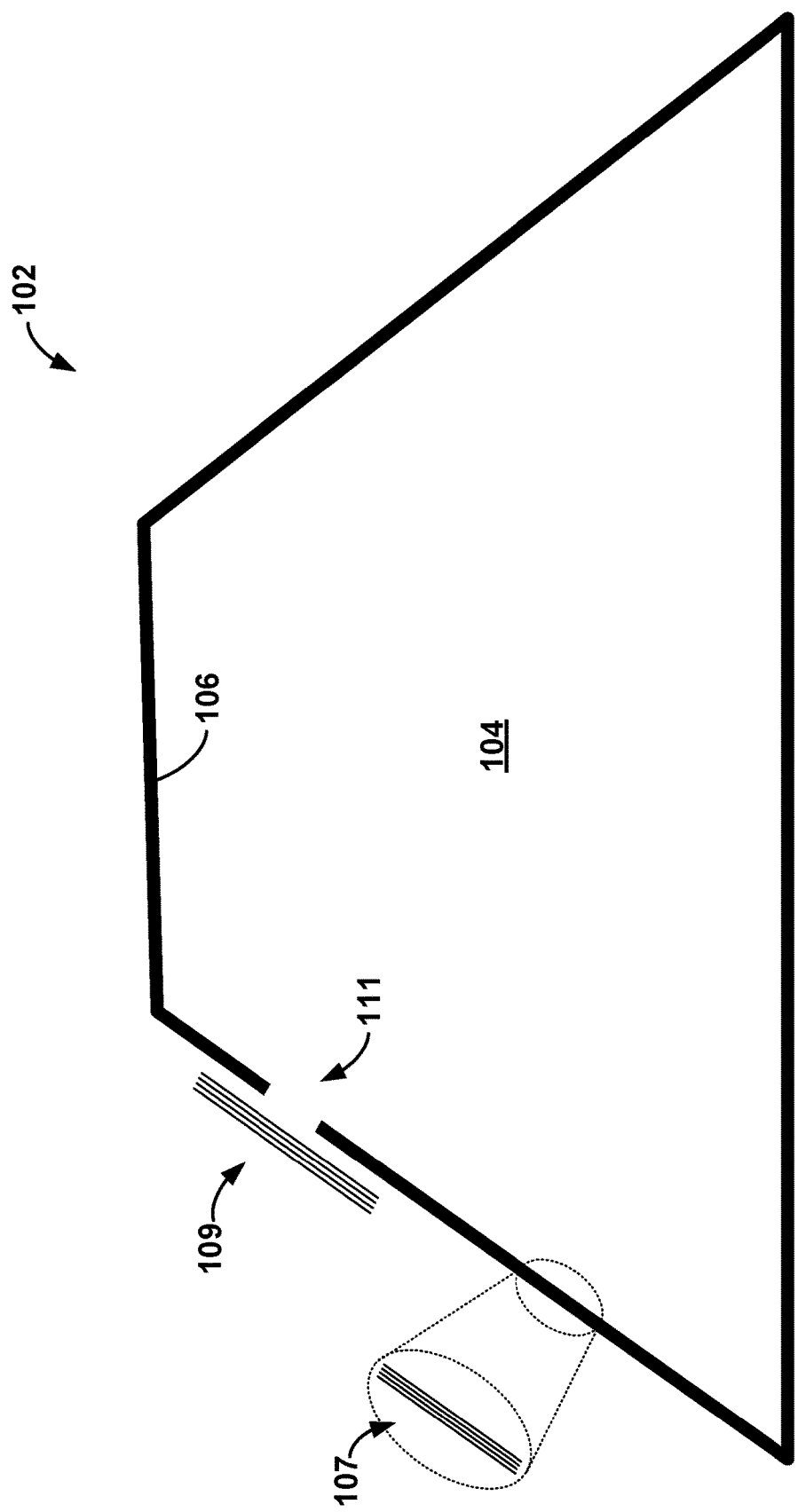
FIG. 8 is a schematic diagram depicting the application of layers of composite material over a damaged area of a structural member, according to an example embodiment.

As shown in a magnified area of FIG. 8, the structural member 102 may include a plurality of layers of uncured or unprocessed composite material 107 (e.g., thermoplastic or thermoset). In this context, processing the structural member 102 may include heating the structural member 102, for example, such that the plurality of layers of uncured or unprocessed composite material 107 bond together (e.g., consolidate) to form a rigid yet lightweight surface against the mandrel 200 or the mandrel 300 (not pictured in FIG. 8).

In a similar manner, processing the structural member 102 may include applying one or more layers of composite material 109 (e.g., uncured or unprocessed thermoset or thermoplastic material) over a damaged area 111 of the structural member 102. In this context, processing the structural member 102 may further include curing the one or more layers of uncured or unprocessed thermoset or thermoplastic material to repair the damaged area 111.

At block 510, the method 500 includes removing air from the second bladder. For example, the one or more pumps 301 may remove the air 304 from the second bladder 208 (or the second bladder 408). Alternatively, the pressurized air 304 may be released to flow out of the second bladder 208 (or the second bladder 408).

At block 512, the method 500 includes removing the mandrel from the cavity. For example, a technician may manually remove the mandrel 200 or the mandrel 300 from the cavity 104 after processing. Prior to removing the mandrel 200 (or the mandrel 300) from the cavity 104, air may be introduced into the first bladder 202 (or the first bladder 402) via venting to atmosphere or pumping, to cause the granular jamming of the material 206 to cease. This may increase the ease of removing the mandrel from the cavity.

Embodiments of the present disclosure can thus relate to one of the enumerated example embodiment (EEEs) listed below.

EEE 1 is a mandrel configured to be inserted into a cavity defined by an interior wall of a structural member to support the structural member during processing, the mandrel comprising: a first bladder containing a material, the material being capable of exhibiting granular jamming when air is removed from the first bladder; and a second bladder configured to expand and apply a force to the first bladder.

EEE 2 is the mandrel of EEE 1, wherein when the mandrel is within the cavity: the first bladder is configured, upon removal of air from the first bladder, to compress the material such that the material exhibits granular jamming and to provide rigid support against the interior wall; and the second bladder is configured to expand and press the first bladder against the interior wall.

EEE 3 is the mandrel of any of EEEs 1-2, wherein the second bladder is positioned adjacent to an exterior surface of the first bladder.

EEE 4 is the mandrel of any of EEEs 1-2, wherein an exterior surface of the first bladder defines a cavity that is substantially surrounded by the first bladder, and wherein the second bladder is positioned within the cavity defined by the first bladder.

EEE 5 is the mandrel of any of EEEs 1-4, wherein the material contained by the first bladder comprises a granular material, sand, ball bearings, glass beads, quartz beads, a foam, a polymer, an emulsion, or a suspension.

EEE 6 is the mandrel of any of EEEs 1-5, wherein when the mandrel is within the cavity, the second bladder is configured to expand and press the first bladder against the interior wall to cause a shape of the first bladder to conform to the interior wall.

EEE 7 is a system for supporting a structural member during processing, the system comprising: a mandrel configured to be inserted into a cavity defined by an interior wall of the structural member, the mandrel comprising: a first bladder comprising a vacuum port, the first bladder containing a material being capable of exhibiting granular jamming when air is removed from the first bladder; and a second bladder comprising a vacuum port, the second bladder being configured to expand and apply a force to the first bladder; and one or more pumps that, when the mandrel is within the cavity, are configured to perform functions comprising: removing air from the first bladder via the vacuum port of the first bladder to compress the material such that the material exhibits granular jamming that causes the first bladder to provide rigid support against the interior wall; and moving air into the second bladder via the vacuum port of the second bladder, thereby causing the second bladder to expand and press the first bladder against the interior wall.

EEE 8 is the system of EEE 7, wherein the second bladder is positioned adjacent to an exterior surface of the first bladder.

EEE 9 is the system of EEE 7, wherein an exterior surface of the first bladder defines a cavity that is substantially surrounded by the first bladder, and wherein the second bladder is positioned within the cavity defined by the exterior surface of the first bladder.

EEE 10 is the system of any of EEEs 7-9, wherein the material contained by the first bladder comprises a granular material, sand, ball bearings, glass beads, quartz beads, a foam, a polymer, an emulsion, or a suspension.

EEE 11 is the system of any of EEEs 7-10, wherein when the mandrel is within the cavity, the one or more pumps are configured to move air into the second bladder via the vacuum port of the second bladder, thereby causing the second bladder to expand and press the first bladder against the interior wall to cause a shape of the first bladder to conform to the interior wall.

EEE 12 is a method for operating a mandrel to support a structural member during processing, the method comprising: inserting the mandrel into a cavity defined by an interior wall of the structural member, the mandrel comprising a first bladder and a second bladder; removing air from the first bladder to compress a material contained by the first bladder such that the material exhibits granular jamming that causes the first bladder to provide rigid support against the interior wall; moving air into the second bladder, thereby expanding the second bladder to press the first bladder against the interior wall; processing the structural member while the material contained by the first bladder exhibits granular jamming that causes the first bladder to provide rigid support against the interior wall and while the second bladder presses the first bladder against the interior wall; removing air from the second bladder; and removing the mandrel from the cavity.

EEE 13 is the method of EEE 12, wherein removing air from the first bladder comprises using one or more pumps to remove air from the first bladder.

EEE 14 is the method of any of EEEs 12-13, wherein moving air into the second bladder comprises using a one or more pumps to move air into the second bladder.

EEE 15 is the method of any of EEEs 12-14, wherein the structural member comprises a plurality of layers of unprocessed composite material, and wherein processing the structural member comprises heating the structural member.

EEE 16 is the method of any of EEEs 12-15, wherein processing the structural member comprises applying one or more layers of composite material over a damaged area of the structural member.

EEE 17 is the method of EEE 16, wherein the structural member is a cured composite structure and the composite material comprises an uncured thermoset composite material, and wherein processing the structural member further comprises curing the uncured thermoset composite material.

EEE 18 is the method of any of EEEs 12-17, wherein moving the air into the second bladder comprises moving air into the second bladder after removing air from the first bladder.

EEE 19 is the method of any of EEEs 12-17, wherein moving the air into the second bladder comprises moving air into the second bladder before removing air from the first bladder.

EEE 20 is the method of any of EEEs 12-17, wherein moving the air into the second bladder comprises moving air into the second bladder before and after removing air from the first bladder.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A mandrel configured to be inserted into a cavity defined by an interior wall of a hollow structural member to support the hollow structural member during processing, the mandrel comprising:
    a first bladder containing a material, the material being capable of exhibiting granular jamming when air is removed from the first bladder; and
    a second bladder configured to expand and apply a force to the first bladder,
    the first bladder and the second bladder being configured to substantially fill the cavity defined by the interior wall of the hollow structural member,
    wherein when the mandrel is within the cavity, the second bladder is configured to expand and press the first bladder against the interior wall to cause a shape of the first bladder and the second bladder to conform substantially to an entirety of the interior wall.

2. The mandrel of claim 1, wherein when the mandrel is within the cavity:
    the first bladder is configured, upon removal of air from the first bladder, to compress the material such that the material exhibits granular jamming and to provide rigid support against the interior wall; and
    the second bladder is configured to expand and press the first bladder against the interior wall.

3. The mandrel of claim 1, wherein the second bladder is positioned adjacent to an exterior surface of the first bladder.

4. The mandrel of claim 1, wherein an exterior surface of the first bladder defines a second cavity that is substantially surrounded by the first bladder, and wherein the second bladder is positioned within the second cavity.

5. The mandrel of claim 1, wherein the material contained by the first bladder comprises a granular material, sand, ball bearings, glass beads, quartz beads, a foam, a polymer, an emulsion, or a suspension.

6. The mandrel of claim 1, wherein the material has at least one dimension greater than 0.1 µm.

7. A mandrel configured to be inserted into a cavity defined by an interior wall of a hollow structural member to support the hollow structural member during processing, the mandrel comprising:
    a first bladder containing a material, the material being capable of exhibiting granular jamming when air is removed from the first bladder; and
    a second bladder configured to expand and apply a force to the first bladder,
    the first bladder and the second bladder being configured to substantially fill the cavity defined by the interior wall of the hollow structural member,
    wherein when the mandrel is within the cavity, the second bladder is configured to expand and press the first bladder against the interior wall to cause a shape of the first bladder and the second bladder to conform substantially to an entirety of the interior wall,
    wherein the second bladder is positioned adjacent to an exterior surface of the first bladder,
    wherein an exterior surface of the first bladder defines a second cavity that is substantially surrounded by the first bladder, and wherein the second bladder is positioned within the second cavity.

8. A system for supporting a hollow structural member during processing, the system comprising:
    a mandrel configured to be inserted into a cavity defined by an interior wall of the hollow structural member, the mandrel comprising:
    a first bladder comprising a first vacuum port, the first bladder containing a material being capable of exhibiting granular jamming when air is removed from the first bladder; and
    a second bladder comprising a second vacuum port, the second bladder being configured to expand and apply a force to the first bladder;
    the first bladder and the second bladder being configured to substantially fill the cavity defined by the interior wall of the hollow structural member, and
    one or more pumps that, when the mandrel is within the cavity, are configured to perform functions comprising:
    removing air from the first bladder via the first vacuum port to compress the material such that the material exhibits granular jamming that causes the first bladder to provide rigid support against the interior wall of the hollow structural member; and
    moving air into the second bladder via the second vacuum port, thereby causing the second bladder to expand and press the first bladder against the interior wall of the hollow structural member,
    wherein when the mandrel is within the cavity, the one or more pumps are configured to move air into the second bladder via the second vacuum port, thereby causing the second bladder to expand and press the first bladder against the interior wall to cause a shape of the first bladder and the second bladder to conform substantially to an entirety of the interior wall.

9. The system of claim 8, wherein the second bladder is positioned adjacent to an exterior surface of the first bladder.

10. The system of claim 8, wherein an exterior surface of the first bladder defines a second cavity that is substantially surrounded by the first bladder, and wherein the second bladder is positioned within the second cavity.

11. The system of claim 8, wherein the material contained by the first bladder comprises a granular material, sand, ball bearings, glass beads, quartz beads, a foam, a polymer, an emulsion, or a suspension.

12. A method for operating the mandrel of claim 1 to support a hollow structural member during processing, the method comprising:
   inserting the mandrel into a cavity defined by an interior wall of the hollow structural member;
   removing air from the first bladder to compress a material contained by the first bladder such that the material exhibits granular jamming that causes the first bladder to provide rigid support against the interior wall of the hollow structural member;
   moving air into the second bladder, thereby expanding the second bladder to press the first bladder against the interior wall of the hollow structural member such that the first bladder and the second bladder substantially fill the cavity defined by the interior wall of the hollow structural member;
   processing the hollow structural member while the material contained by the first bladder exhibits granular jamming that causes the first bladder to provide rigid support against the interior wall of the hollow structural member and while the second bladder presses the first bladder against the interior wall of the hollow structural member;
   removing air from the second bladder; and
   removing the mandrel from the cavity.

13. The method of claim 12, wherein removing air from the first bladder comprises using one or more pumps to remove air from the first bladder.

14. The method of claim 12, wherein moving air into the second bladder comprises using a one or more pumps to move air into the second bladder.

15. The method of claim 12, wherein the hollow structural member comprises a plurality of layers of unprocessed composite material, and wherein processing the hollow structural member comprises heating the hollow structural member.

16. The method of claim 12, wherein moving the air into the second bladder comprises moving air into the second bladder after removing air from the first bladder.

17. The method of claim 12, wherein moving the air into the second bladder comprises moving air into the second bladder before removing air from the first bladder.

18. The method of claim 12, wherein moving the air into the second bladder comprises moving air into the second bladder before and after removing air from the first bladder.

19. The method of claim 12, wherein processing the hollow structural member comprises applying one or more layers of a composite material over a damaged area of the hollow structural member.

20. The method of claim 19, wherein the hollow structural member is a cured composite structure and the composite material comprises an uncured thermoset composite material, and wherein processing the hollow structural member further comprises curing the uncured thermoset composite material.

* * * * *